(12) United States Patent
Meernik

(10) Patent No.: US 7,549,644 B1
(45) Date of Patent: Jun. 23, 2009

(54) RECTANGULAR OPTIMIZATION GRID AND ASSOCIATED MATHEMATICAL GAMES

(76) Inventor: Richard Meernik, The Pines Senior Apts., 325 Wilkinson St., Apt. 234, Chelsea, MI (US) 48118

( * ) Notice: Subject to any disclaimer, the term of this patent is extended or adjusted under 35 U.S.C. 154(b) by 285 days.

(21) Appl. No.: 11/549,650

(22) Filed: Oct. 15, 2006

(51) Int. Cl.
*A63F 3/00* (2006.01)

(52) U.S. Cl. ..................................... 273/299

(58) Field of Classification Search ................. 273/272, 273/299; 434/188, 191
See application file for complete search history.

(56) References Cited

U.S. PATENT DOCUMENTS

| | | | | |
|---|---|---|---|---|
| 2,811,360 A | * | 10/1957 | Cohen | 273/272 |
| 4,565,374 A | * | 1/1986 | Pak | 273/272 |
| 5,314,190 A | | 5/1994 | Lyons | |
| 5,338,203 A | | 8/1994 | Rheams | |
| 5,478,087 A | * | 12/1995 | Dumisani | 273/272 |
| 5,893,718 A | * | 4/1999 | O'Donnell | 434/128 |
| 6,581,937 B1 | | 6/2003 | Crisswell | |
| 6,769,692 B1 | * | 8/2004 | Cavalluzzo | 273/272 |
| 6,997,457 B2 | * | 2/2006 | Arana et al. | 273/260 |
| 2002/0015936 A1 | * | 2/2002 | Donn | 434/209 |

* cited by examiner

*Primary Examiner*—William M Pierce

(57) ABSTRACT

An apparatus for mathematical games and activities to provide both entertainment and skill development based on a rectangular grid based optimization area with an odd number of elements in each row and column. The essential elements forming the rows and columns are numerical function symbols, including but not limited to +, −, *, and /, alternating both vertically in the columns and horizontally in the rows with locations for placement of numerical values. The optimization area is arranged such that numerical value locations do not occur in the corners and function symbol locations on the outer perimeter are left blank. Additional locations may be provided for placement of parentheses. A predefined set of numerical values is provided for placement onto the optimization area. A finite set of parenthesis pairs may be included. Placement of the numerical values and optional parentheses is done with the objective of maximizing the optimization area value.

9 Claims, 7 Drawing Sheets

RECTANGULAR OPTIMIZATION GRID AND ASSOCIATED MATHEMATICAL GAMES

CROSS-REFERENCE TO RELATED APPLICATION

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to mathematical games and activities for both entertainment and skill development.

2. Prior Art

Various mathematical games (e.g., Crisswell, U.S. Pat. No. 6,581,937; Lyons, U.S. Pat. No. 5,314,190; Rheams, U.S. Pat. No. 5,338,203) have been developed with the objective of combining skill development and entertainment. Such prior art games suffer from one or more defects of the following nature: rules that are excessively involved; elements of chance that obscure the value of the desired skill development; little potential for engaging the participants at a strategic level; and limited ability to provide similar formats to accommodate both multiple participant and single participant usage.

3. Objects and Advantages

Accordingly, several objects and advantages of the present invention are consequences of overcoming those defects in the prior art. An apparatus is provided that can be utilized to create both multiple participant and single participant games. The multiple participant games utilize people's competitive spirit while single participant games, which may alternatively be called activities, provide a challenging objective. The capability of creating games or activities in a single participant format has the advantage of providing a means for the constructive and entertaining use of time in such settings as a classroom or during a long automobile ride.

Additional characteristics that overcome drawbacks in the prior art include simple rules that amount to little more than the standard rules of arithmetic operations, equal starting resources for all participants, and no chance elements other than possibly to determine order-of-play. In multiple participant games, those characteristics, together with having open display of all information, combine so as to cause participants to focus on two areas: 1) knowledge of arithmetic operation rules, and 2) the challenge of developing strategies to make better use of finite resources than their opponents. In single participant activities, the focus on knowledge of arithmetic rules remains the same, but the second focus simply shifts from making better use of finite resources, to making optimal use of those resources.

Another object and advantage arising from the family of games and activities associated with the present invention is a means by which the desired mathematical skills can be exercised in an entertaining fashion with a clear and simple objective. Since the focus is on the objective of making the best possible use of limited resources, the necessary mathematical skills are practiced in the pedagogically desirable context of a means to achieve an objective.

Another object and advantage of the present invention is a consequence of the similarity between explicitly attempting to make optimal use of limited resources in the games and activities associated with the present invention, and the implicit thinking involved in people's everyday decisions as they make trade-offs and try to do the best they can with their available resources. As a result, not only do these games and activities provide an entertaining way to practice arithmetic skills, they also provide a means to help develop explicit and rational decision making.

Yet another advantage arising from the family of games and activities associated with the present invention is that those games and activities can be scaled in size and complexity according to the capability of the participants. With elementary age children, the optimization grid size can be small, the functions simple, and the numerical values small integers. For college level use, the grid size would be larger and the maximization objective could be a challenging optimization problem.

Further objects and advantages of the present invention will become apparent from a consideration of the drawings and ensuing description.

SUMMARY

The present invention defines a family of mathematical games and activities based on a common format that provides both entertainment and skill development. The common format utilizes an optimization area based on a rectangular grid with an odd number of elements in each row and each column. The essential elements forming the rows and columns are comprised of numerical function symbols, including, but not limited to +, −, *, and /, alternating both vertically in the columns and horizontally in the rows with locations for placement of numerical values. The grid is arranged such that numerical values do not occupy the corner grid locations and grid locations on the perimeter that would be expected to have function symbols, according to the alternating pattern, are left blank. Additional locations may be provided for placement of parenthesis.

In combination with the optimization area is a finite set of numerical values for placement onto the optimization area in those locations specified to receive numerical values. In addition, a finite set of parenthesis pairs may be included and placed by a participant in locations provided for placement of parentheses.

The optimization area has a defined value that is determined by combining the values resulting from the numerical evaluation of each arithmetic expression row from left to right and each arithmetic expression column from top to bottom. Placement of the numerical values and optional parentheses is done with the objective of maximizing the optimization area value.

DRAWINGS

Figures

DETAILED DESCRIPTION

Preferred Embodiment

Figure 1:
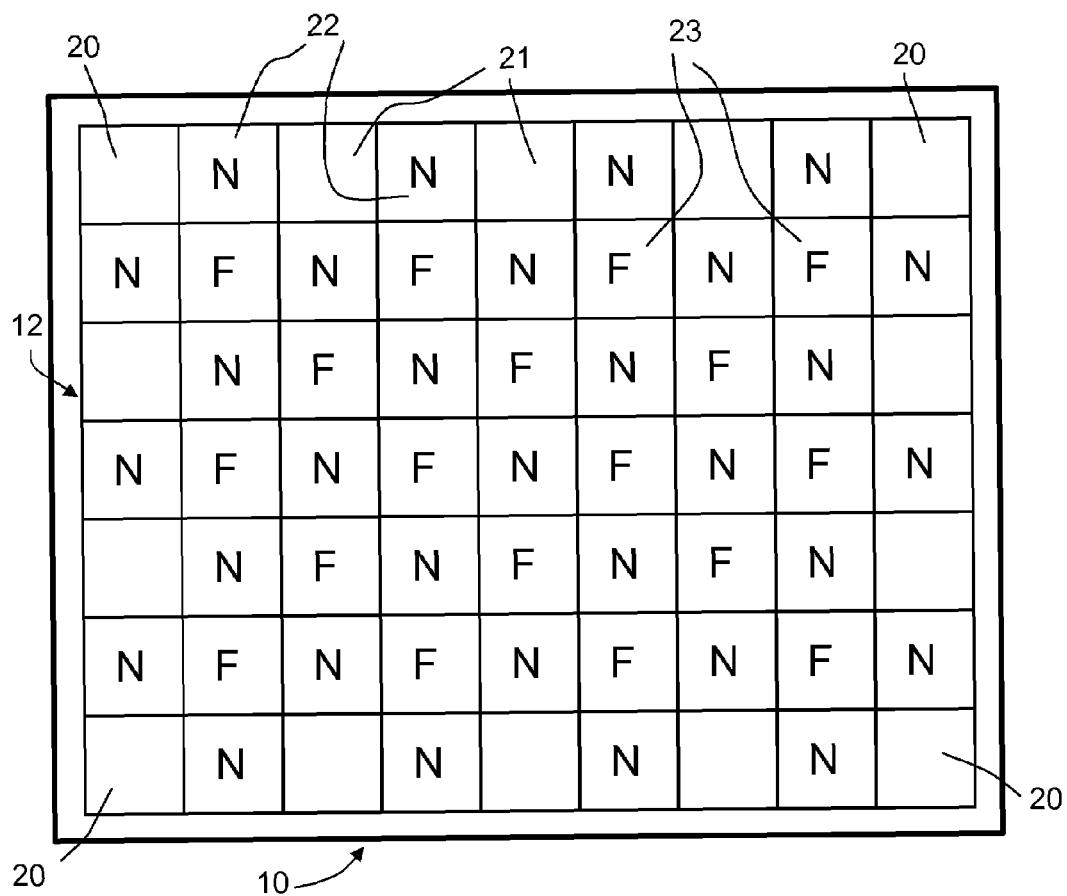
FIG. 1 is a plan view of the basic layout of a seven row by nine column grid.

FIG. 1 illustrates the optimization area 10 structure based on a rectangular grid 12 consisting of a plurality of cells forming an odd number of rows and an odd number of columns. The grid structure is comprised of blank corner cells 20, blank perimeter cells 21, cell locations 22 for placement of numerical values, and cell locations 23 for numerical function symbols. The numerical function symbols may include, but are not limited to +, −, *, and /. Locations 22 for entry of numerical values alternate both horizontally and vertically with locations 23 for numerical function symbols. Where cell locations on the outside perimeter would be expected to have function symbols based on the alternating pattern, those cell locations are left empty and are denoted as blank corner cells 20 and blank perimeter cells 21. Additionally, the alternating pattern of locations for numerical values 22 and locations for numerical function symbols 23 is such that the numerical value locations 22 do not occupy the corner cells 20.

Figure 2:
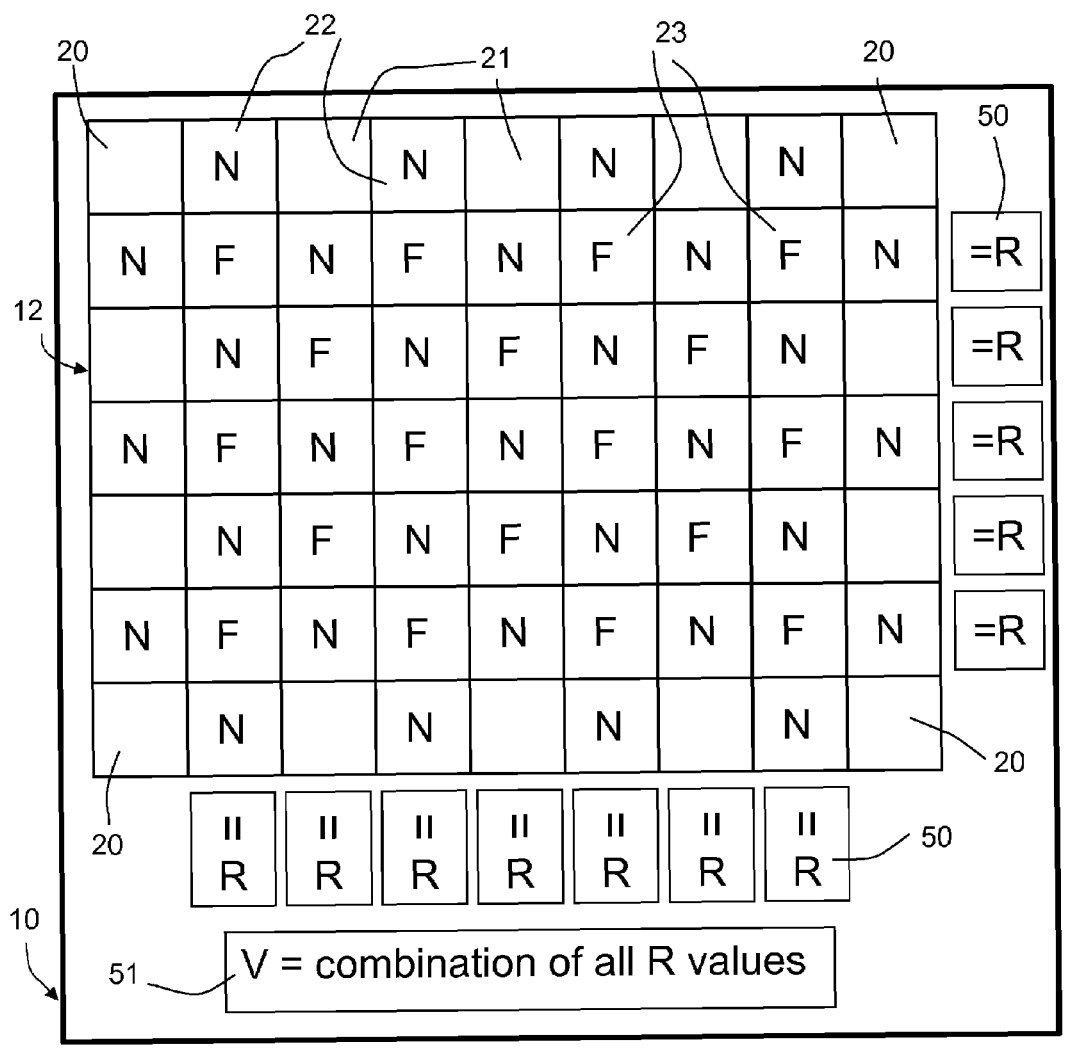
FIG. 2 is a plan view of a seven row by nine column grid showing rows and columns to be arithmetically evaluated.

FIG. 2 depicts the process of determining the value of the optimization area 10. Since the top row, the bottom row, the left-most column, and the right-most column do not include function symbols, only the inner rows and columns form arithmetic expressions. The inner rows are arithmetically evaluated from left to right according to standard arithmetic rules to determine intermediate results 50 from the rows. The inner columns are arithmetically evaluated from top to bottom according to standard arithmetic rules to determine intermediate results 50 from the columns. Those intermediate results 50 are then combined to obtain the optimization grid value 51. The method of combining the intermediate results 50 would normally, but not necessarily, be a simple summation. Alternative ways to combine intermediate results 50 would include summing only the rows, summing only the columns, and taking the difference between the sum of the rows and the sum of the columns.

Figure 3:
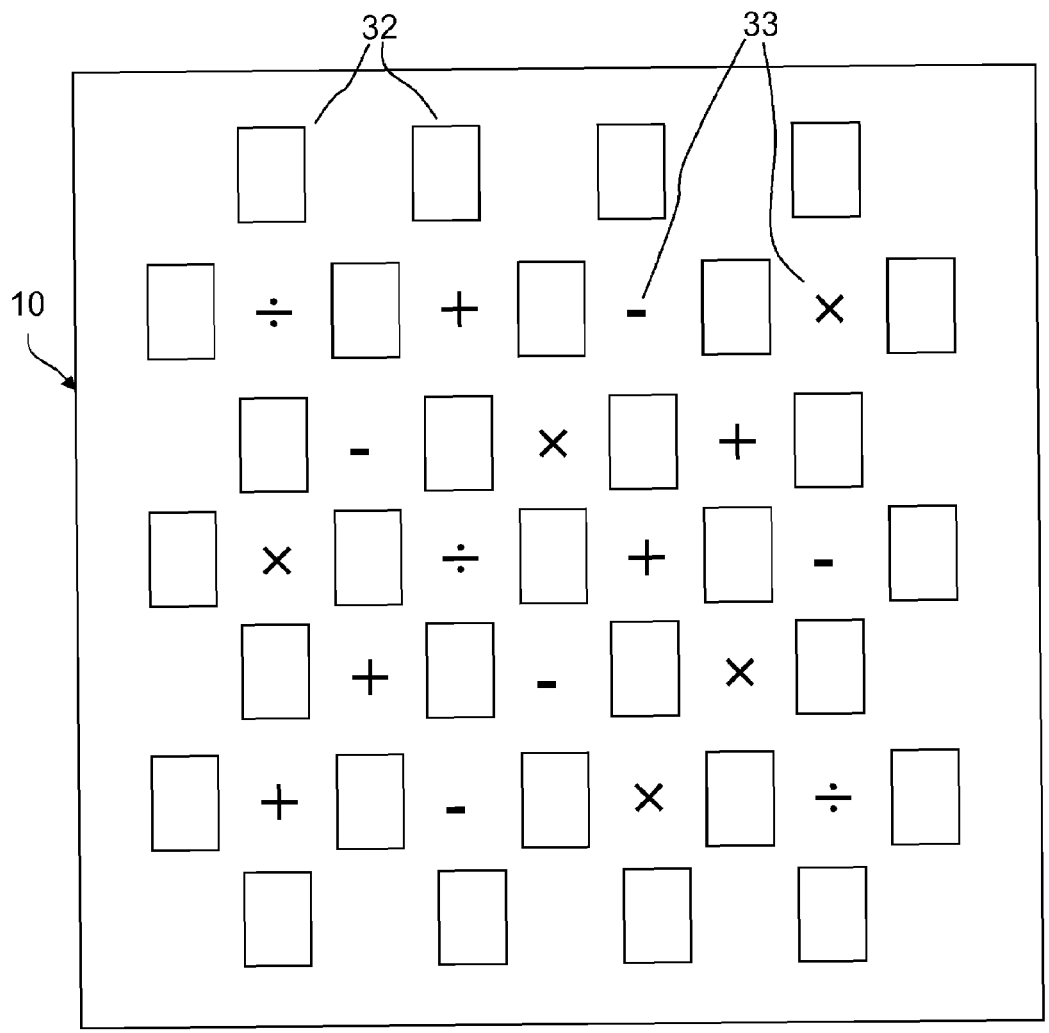
FIG. 3 is a plan view of a seven row by nine column optimization area showing locations for numerical entries and a sample set of function entries.

FIG. 3 shows a plan view of an optimization area 10 with the explicit lines of the rectangular grid 12 removed. The cell locations 22 for placement of numerical values are depicted by receptacles 32, and the cell locations for symbols 23 have been filled with a sample set of numerical function symbols 33.

Figure 4:
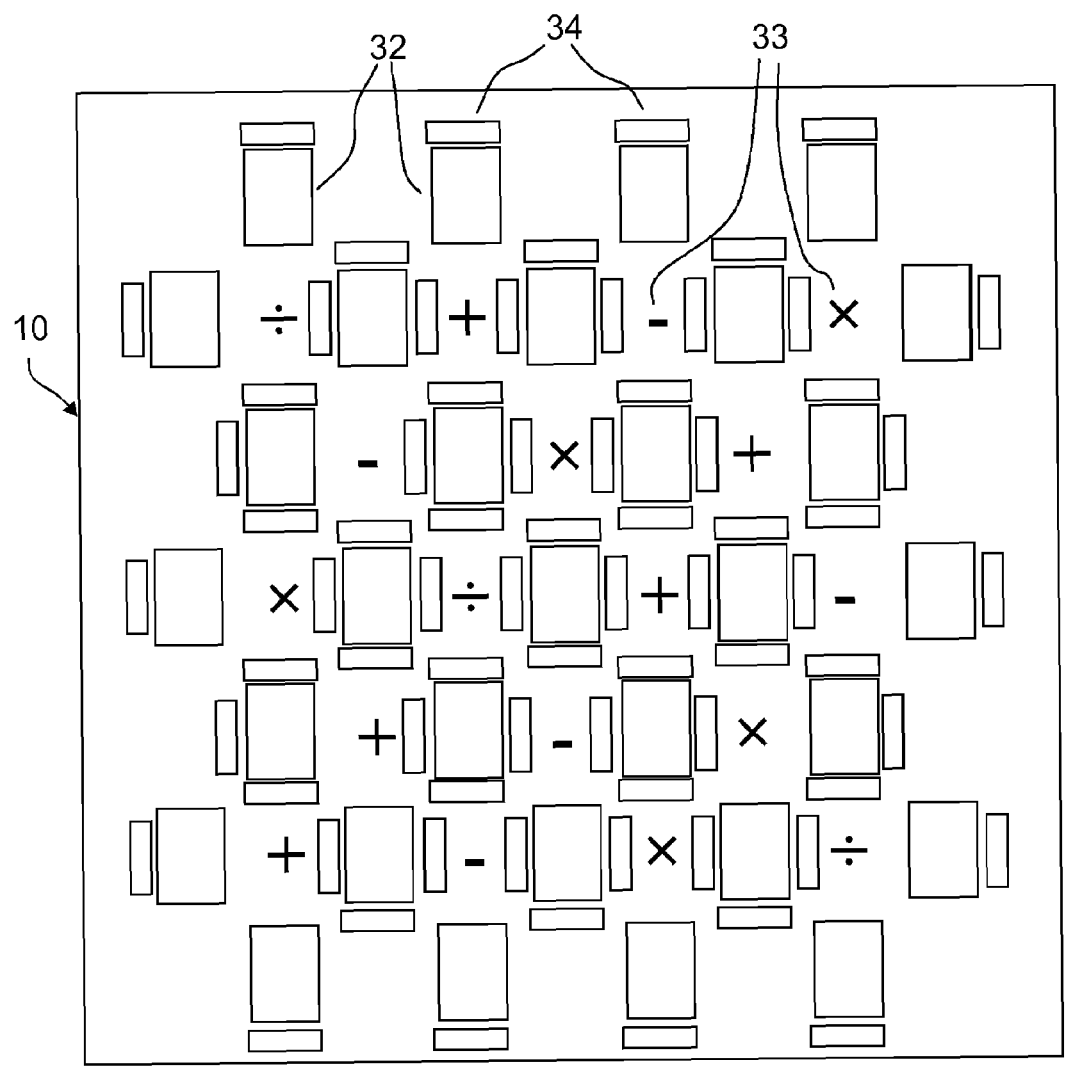
FIG. 4 is a plan view of a seven row by nine column optimization area showing locations for numerical entries, a sample set of function entries, and locations for optional parenthesis.

FIG. 4 shows a plan view similar to FIG. 3, but includes receptacles 34, in the arithmetically possible locations for parentheses, for the placement of the optional parenthesis symbols.

OPERATION

Preferred Embodiment

Figure 5:
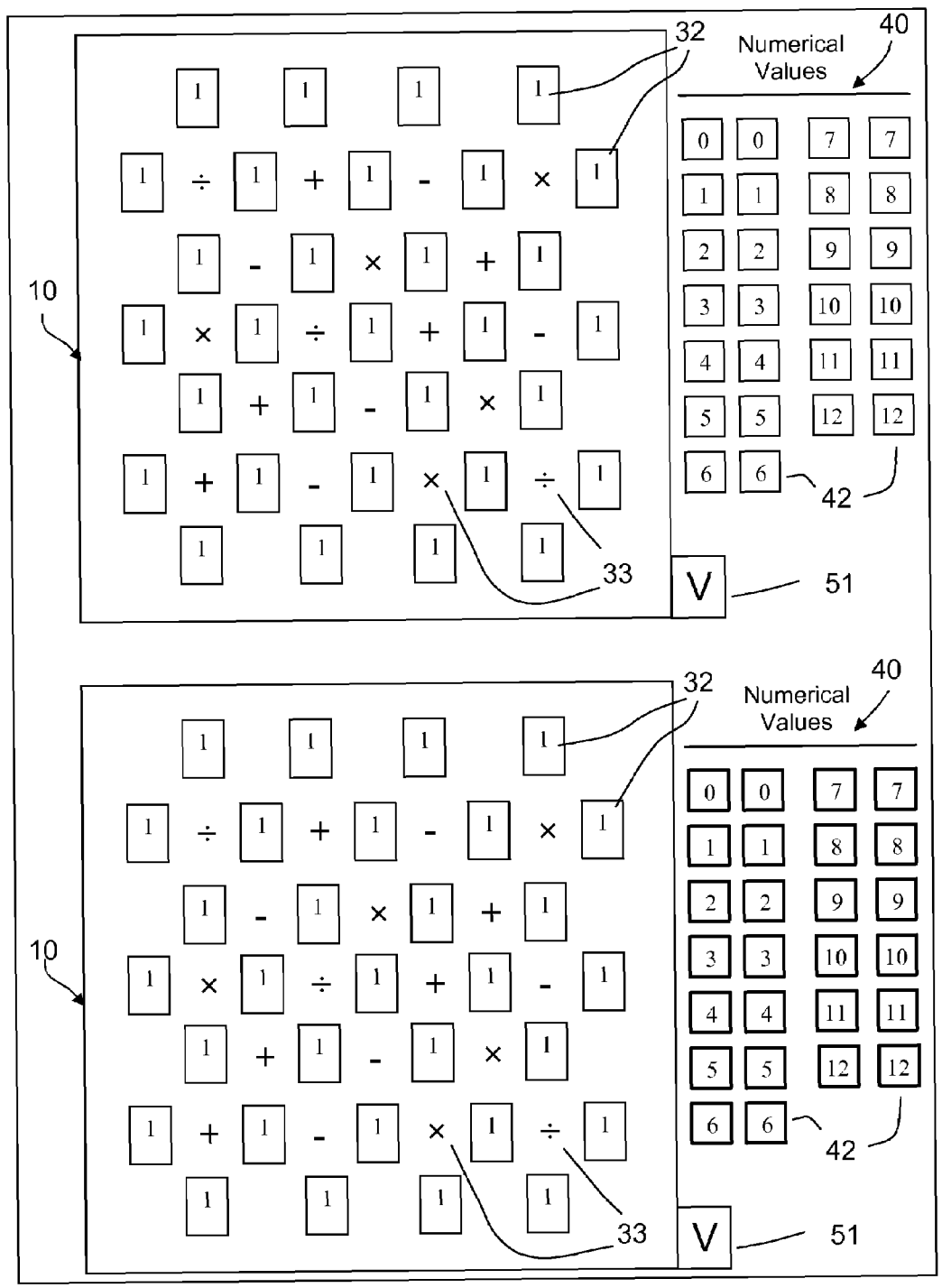
FIG. 5 is a plan view of the elements needed for a two-player game format that utilizes separate optimization areas.

The optimization area 10 of the present invention, illustrated in FIGS. 1-4, lends itself to the creation of a variety of games and activities. The basic elements of one such game, formatted for two participants, are shown in FIG. 5. An optimization area 10 is assigned to each participant, with each area 10 being identical. Each participant would also be assigned an identifiable set 40 of numeric values 42, with each set 40 having the same values 42. As the number of values 42 is not necessarily the same as the number of receptacles 32, the receptacles 32 are initialized with a value of unity. Such initialization also serves to make it possible to arithmetically evaluate the optimization area value 51 throughout the duration of play.

Play consists of each participant, in turn, placing one of their values 42 onto a receptacle 32 on either their optimization area 10 or the optimization area 10 belonging to their opponent. The objective of each participant is to have an optimization area value 51 greater than their opponent at the conclusion of play. Play is finished when either all values 42 have been played or all receptacles 32 have been filled.

The same basic set of game rules as just described can also be applied with a different size optimization area 10, a different set of function symbols 33, a different set 40 of numerical values 42, or with different initial values inserted into the receptacles 32. The game may also be played with more than two participants. Additionally, the essentials of the game do not change if the objective is the minimization of the optimization area value rather than its maximization.

Figure 6:
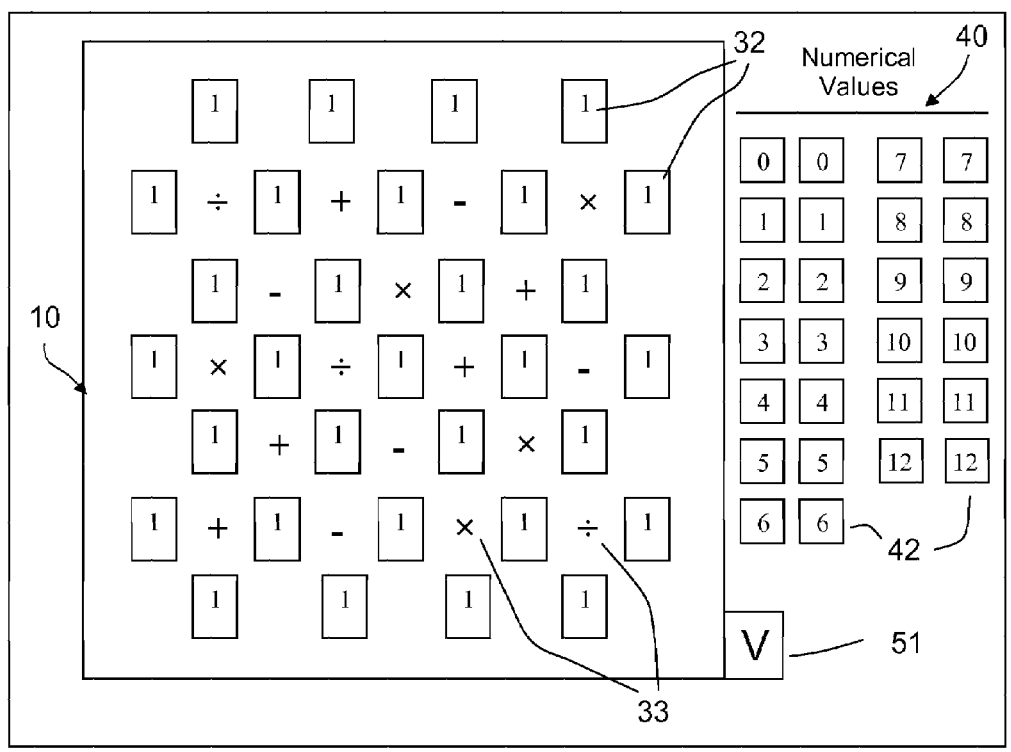
FIG. 6 is a plan view of the elements needed for a two-player game format that utilizes a common optimization area.

An alternative multi-participant design is shown in FIG. 6 that involves a single optimization area 10 with receptacles 32 initialized with the value of unity. A set of numerical values 42 is provided for placement in the receptacles 32. Each participant during their turn, with the objective of increasing the value of the optimization area 10, either adds one of the unused numerical values 42, rearranges values 42 already placed on the optimization area 10, or does both. Any participant who fails to increase the value of the optimization area 10 would be eliminated and the values in the locations 32 reset to their values prior to that participant's turn.

Figure 7:
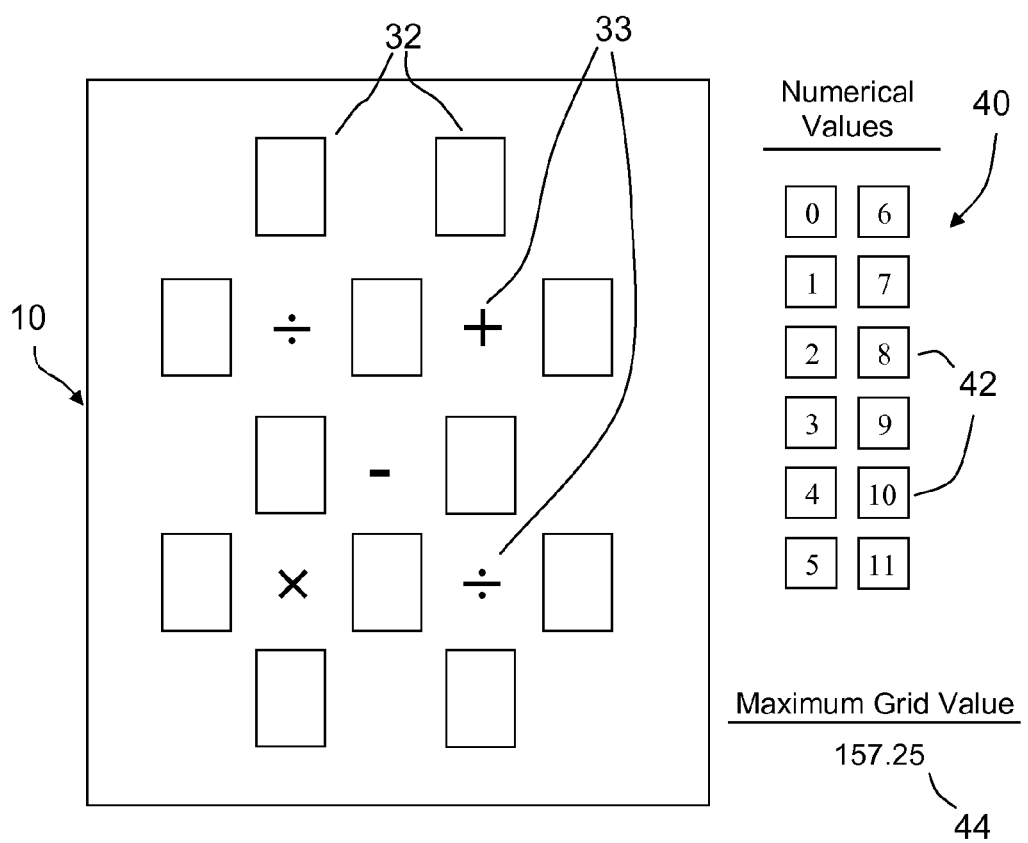
FIG. 7 is a plan view of a five row by five column optimization area formatted as a single participant activity.

A single participant design is shown in FIG. 7. The essential elements are an optimization area 10, a set 40 of numerical values 42, and the corresponding maximum possible optimization area value 44. Rather than trying to make better use of values 42 than an opponent, the objective in this format is to make optimum use of the values 42 and obtain an optimization area value 51 equal to the maximum value 44.

CONCLUSION, RAMIFICATION, AND SCOPE

The reader will see that the family of games and activities associated with the present invention provide a variety of entertaining ways to both exercise arithmetic skills as well as to practice explicit and rational decision making in order to make the best possible use of limited resources. The range of possible games and activities vary from very simple to highly complex in either single-participant or multiple-participant formats.

While the above description contains various specifications, these should not be construed as limitations on the scope of the invention, but rather as exemplifications of some possible embodiments thereof. Many other variations are possible. For example, while the concepts have been presented in the form of a board game or paper based activity, the concepts, including the means to evaluate the optimization grid value, could also be implemented as stand-alone electronic games or computer based games. Additionally, by such an approach as including equal signs at the end of the rows and columns, once could create a grid based on an even number of rows and columns.

Accordingly, the scope of the invention should be determined not by the embodiments illustrated, but by the appended claims and their legal equivalents.

The invention claimed is:

1. An apparatus for improving mathematical skills comprising:
   (a) an optimization area based on a rectangular grid of cells with the said rectangular grid having an odd number of rows, an odd number of columns, a perimeter consisting of those said cells that are not entirely surrounded by other said cells, and with the content of said cells defined by position such that,
      (1) said cells that are locations for placement of numeric values and said cells that are locations with arithmetic function symbols form an alternating pattern both vertically in the columns and horizontally in the rows, and
      (2) said alternating pattern is such that said cells that are locations for placement of numerical values are not disposed in the rectangular grid corners, and
      (3) said cells disposed in the said perimeter of the said rectangular grid and simultaneously disposed such that they would be expected to be locations with arithmetic function symbols, based on said alternating pattern, are instead empty;
   (b) a set of numeric values for placement into said locations for placement of numeric values,
   (c) evaluation means to calculate an optimization area value, when all locations for placement of numerical values have been assigned values and all consequent arithmetic operations are arithmetically defined, comprising:
      (1) evaluating arithmetically, from left to right, the rows of said optimization area that form arithmetic expressions,
      (2) evaluating arithmetically, from top to bottom, the columns of said optimization area that form arithmetic expressions,
      (3) combining the evaluation results from the rows and columns in a predetermined manner to define the value of said optimization area;
   whereby a participant exercises their mathematical skills by placing said numeric values onto said locations for placement of numeric values so as to maximize said optimization area value.

2. The apparatus of claim 1 further including parenthesis receptacles at mathematically appropriate locations for placement of parentheses and a finite set of parentheses pairs.

3. A method for improving mathematical skills for multiple participants comprising:
   (a) providing to each said participant identical apparatus comprising:
      (1) an optimization area based on a rectangular grid of cells with the said rectangular grid having an odd number of rows, an odd number of columns, a perimeter consisting of those said cells that are not entirely surrounded by other said cells, and with the content of said cells dependent on position such that,
         i. said cells that are locations for placement of numeric values and said cells that are locations with arithmetic function symbols form an alternating pattern both vertically in the columns and horizontally in the rows, and
         ii. said alternating pattern is such that said cells that are locations for placement of numerical values are not disposed in the rectangular grid corners, and
         iii. said cells disposed in the said perimeter of the said rectangular grid and simultaneously disposed such that they would be expected to be locations with arithmetic function symbols, based on said alternating pattern, are instead empty;
      (2) evaluation means to calculate an optimization area value, when all locations for placement of numerical values have been assigned values and all consequent arithmetic operations are arithmetically defined, comprising:
         i. evaluating arithmetically, from left to right, the rows of said optimization area that form arithmetic expressions,
         ii. evaluating arithmetically, from top to bottom, the columns of said optimization area that form arithmetic expressions,
         iii. combining the evaluation results from the rows and columns in a predetermined manner to define the value of said optimization area;
   (b) providing to each participant a set of numeric values for placement into said locations for placement of numeric values, wherein each said set of numeric values are numerically identical but identifiable as belonging to a specific participant,
   (c) placing by a first one of said participants of one of said first one's numeric values onto one of said locations for placement of numeric values on any of said participant's optimization areas,
   (d) placing, in turn, by each one of said participants of one of said one's numeric values onto one of said locations for placement of numeric values on any of said participant's optimization areas until either all of said numeric values associated with all said participants have been used, or all said locations for placement of numerical values have been filled,
   (e) specifying the winner by determining which of said participants has the optimization area with the highest value,
   whereby said participants exercise their mathematical skills in the process of determining optimum locations for placement of said numeric values and in evaluating said optimization area values.

4. The method of claim 3 further including the step of providing, prior to step (b), initial values in said locations for placement of numeric values such that said evaluation means may be used to define initial value of said optimization area.

5. The method of claim 4 wherein said initial values are all equal to one.

6. A method for improving mathematical skills for a finite number of participants comprising:
   (a) providing a single apparatus comprising,
      (1) an optimization area based on a rectangular grid of cells with the said rectangular grid having an odd number of rows, an odd number of columns, a perimeter consisting of those said cells that are not entirely surrounded by other said cells, and with the content of said cells dependent on position such that,
         i. said cells that are locations for placement of numeric values and said cells that are locations with arithmetic function symbols form an alternating pattern both vertically in the columns and horizontally in the rows, and
         ii. said alternating pattern is such that said cells that are locations for placement of numerical values are not disposed in the rectangular grid corners, and
         iii. said cells disposed in the said perimeter of the said rectangular grid and simultaneously disposed such that they would be expected to be locations with arithmetic function symbols, based on said alternating pattern, are instead empty;
   (2) a set of numeric values for placement into said locations for placement of numeric values,
   (3) evaluation means to calculate an optimization area value, when all locations for placement of numerical values have been assigned values and all consequent arithmetic operations are arithmetically defined, comprising:
      i. evaluating arithmetically, from left to right, the rows of said optimization area that form arithmetic expressions,
      ii. evaluating arithmetically, from top to bottom, the columns of said optimization area that form arithmetic expressions,
      iii. combining the evaluation results from the rows and columns in a predetermined manner to define the value of said optimization area;
(b) placing in said optimization area by a first one of said participants of one of said numeric values onto one of said locations for placement of numeric values
(c) determining the change in the value of the said optimization area due to actions of said first one,
(d) penalizing said first one in a predetermined manner and resetting said optimization area locations for placement of numeric values to their immediate prior condition if the value of the said optimization area did not increase,
(e) passing of turn to the next participant,
(f) placing by said next participant of either an unused numeric value from said set of numeric values onto appropriate locations not yet used on the said optimization area, or rearranging by said next participant of already placed numeric values, or a combination of placing and rearranging by said next participant,
(g) determining the change in the value of the said optimization area due to said next participant's actions,
(h) penalizing said next participant in a predetermined manner and resetting said optimization area locations for placement of numeric values to their immediately prior conditions if the value of the said optimization area did not increase,
(i) repeating steps (e) through (h) until no said participant is able to increase the value of the said optimization area, whereby said participants exercise their mathematical skills in the process of determining optimum locations for placement of said numeric values and in evaluating said optimization area values.

7. The method of claim 6 further including the step of providing for the said apparatus, prior to step (b), the maximum possible value of said optimization area.

8. The method of claim 6 further including the step of providing, prior to step (b), initial values in said locations for placement of numeric values such that said evaluation means may be used to define initial value of said optimization area.

9. The method of claim 8 wherein said initial values are all equal to one.

* * * * *